(12) United States Patent
Chang (10) Patent No.: US 9,682,639 B2
(45) Date of Patent: Jun. 20, 2017

(54) RECLINING APPARATUS FOR VEHICLE SEAT

(71) Applicant: Hyundai Dymos Incorporated, Seosan, Chungcheongnam-Do (KR)

(72) Inventor: Seung Hun Chang, Gyeonggi-Do (KR)

(73) Assignee: Hyundai Dynos Incorporated, Seosan, Chungcheongnam-do (KR)

( * ) Notice: Subject to any disclaimer, the term of this patent is extended or adjusted under 35 U.S.C. 154(b) by 367 days.

(21) Appl. No.: 14/383,847

(22) PCT Filed: Mar. 6, 2013

(86) PCT No.: PCT/KR2013/001783
§ 371 (c)(1),
(2) Date: Nov. 4, 2014

(87) PCT Pub. No.: WO2013/133615
PCT Pub. Date: Sep. 12, 2013

(65) Prior Publication Data
US 2015/0084392 A1    Mar. 26, 2015

(30) Foreign Application Priority Data
Mar. 6, 2012 (KR) .................. 10-2012-0022765

(51) Int. Cl.
*B60N 2/235* (2006.01)

(52) U.S. Cl.
CPC ........... *B60N 2/2356* (2013.01); *B60N 2/236* (2015.04); *B60N 2205/20* (2013.01)

(58) Field of Classification Search
None
See application file for complete search history.

(56) References Cited

U.S. PATENT DOCUMENTS

| | | | | |
|---|---|---|---|---|
| 4,789,205 A | * | 12/1988 | Pipon | B60N 2/2356 16/341 |
| 6,908,156 B1 | | 6/2005 | Park et al. | |
| 8,960,798 B2 | * | 2/2015 | Ito | A47C 1/025 297/366 |
| 2005/0168034 A1 | | 8/2005 | Fast | |
| 2005/0184549 A1 | * | 8/2005 | Robinson | B60N 2/01583 296/65.03 |

(Continued)

FOREIGN PATENT DOCUMENTS

| | | | | |
|---|---|---|---|---|
| CN | 1522891 A | | 8/2004 | |
| CN | WO 2013026338 A1 | * | 2/2013 | ........... B60N 2/2356 |

(Continued)

OTHER PUBLICATIONS

European Search Report for European Patent Application No. 13758588.1, dated Oct. 29, 2015, 7 pages.

(Continued)

*Primary Examiner* — David E Allred
(74) *Attorney, Agent, or Firm* — Mintz Levin Cohn Ferris Glovsky and Popeo, P.C.; Peter F. Corless (57) ABSTRACT

Disclosed herein is a reclining apparatus for a vehicle seat that is capable of improving coupling strength and entire durability and removing operation noise by removing a clearance between components at the time of a reclining operation and is capable of decreasing a cost and a weight by decreasing an entire size.

12 Claims, 11 Drawing Sheets

(56) References Cited

U.S. PATENT DOCUMENTS

| | | | | |
|---|---|---|---|---|
| 2006/0055222 | A1* | 3/2006 | Bonk | B60N 2/236 297/367 R |
| 2010/0231022 | A1* | 9/2010 | Kim | B60N 2/2356 297/367 R |
| 2013/0113261 | A1* | 5/2013 | Mikasa | B60N 2/236 297/367 P |
| 2013/0161994 | A1* | 6/2013 | Ito | B60N 2/236 297/367 P |
| 2013/0161995 | A1* | 6/2013 | Yamada | B60N 2/12 297/367 P |
| 2013/0264850 | A1* | 10/2013 | Maeda | B60N 2/4228 297/216.14 |
| 2013/0264858 | A1* | 10/2013 | Ootaki | B60N 2/02 297/463.1 |
| 2014/0077537 | A1* | 3/2014 | Higashi | B60N 2/427 297/216.13 |
| 2014/0077561 | A1* | 3/2014 | Sasaki | B60N 2/2356 297/367 P |
| 2014/0077562 | A1* | 3/2014 | Higashi | B60N 2/235 297/367 R |
| 2014/0077563 | A1* | 3/2014 | Higashi | A47C 1/024 297/367 R |
| 2014/0091607 | A1* | 4/2014 | Maeda | A47C 1/024 297/354.12 |

FOREIGN PATENT DOCUMENTS

| | | | | |
|---|---|---|---|---|
| DE | 19814225 A1 | * | 10/1998 | B60N 2/2356 |
| FR | 2884191 A1 | | 10/2006 | |
| GB | 1193971 A | * | 6/1970 | B60N 2/2352 |
| JP | 2000-102440 A | | 4/2000 | |
| JP | 2001-157615 A | | 6/2001 | |
| JP | 2005-253670 A | | 9/2005 | |
| JP | 2006-014943 A | | 1/2006 | |
| JP | 2009-285246 A | | 12/2009 | |
| JP | WO 2010007895 A1 | * | 1/2010 | B60N 2/2356 |
| JP | WO 2010007896 A1 | * | 1/2010 | B60N 2/2356 |
| JP | WO 2012114814 A1 | * | 8/2012 | A47C 1/025 |
| JP | WO 2012132552 A1 | * | 10/2012 | B60N 2/2356 |
| JP | WO 2012173098 A1 | * | 12/2012 | B60N 2/2356 |
| KR | 10-2004-0074688 A | | 8/2004 | |
| KR | 10-2006-0016866 A | | 2/2006 | |
| WO | 2011/070829 A1 | | 6/2011 | |
| WO | 2011/113416 A2 | | 9/2011 | |

OTHER PUBLICATIONS

Chinese Office Action for Chinese Application No. 201380023275.0, dated Nov. 18, 2015, English translation, 8 pages.

* cited by examiner

RECLINING APPARATUS FOR VEHICLE SEAT

CROSS-REFERENCE TO RELATED APPLICATIONS

This application is a U.S. national phase application, pursuant to 35 U.S.C. §371, of PCT/KR2013/001783, filed Mar. 6, 2013, designating the United States, which claims priority to Korean Application No. 10-2012-0022765, filed Mar. 6, 2012. The entire contents of the aforementioned patent applications are incorporated herein by this reference.

TECHNICAL FIELD

The present invention relates to a reclining apparatus for a vehicle seat, and more particularly, to a technology associated with a reclining apparatus for a vehicle seat capable of improving strength and removing operation noise by removing a clearance between components at the time of a reclining operation (a locked state and a locked process).

BACKGROUND ART

A seat provided in a vehicle is configured to include a seat back supporting an upper body of a passenger, a seat cushion supporting a lower body of the passenger such as hips, thighs, and the like, and a head rest supporting the back of a head of the passenger, wherein a reclining apparatus enabling adjustment of an angle of the seat back with respect to the seat cushion is mounted at a portion at which the seat back and the seat cushion are connected to each other.

As the reclining apparatus, there are a manual type reclining apparatus adjusting an angle of the seat back by a lever manipulation by the passenger and a power type reclining apparatus automatically operated by power of a motor through a switch manipulation, and all of the reclining apparatuses should have strong coupling force between components at the time of a reclining operation in order to secure safety of the passenger regardless of an operation scheme.

The reclining apparatus includes a component coupled to the seat back and a component coupled to the seat cushion, and these two components should show strong coupling force at the time of the reclining operation. When these two components have weak coupling force, an angle of the seat back is easily adjusted even by small impact. In this case, a change in the angle of the seat back is made in a state in which it is not desired by the passenger, such that the passenger is injured.

In order for the reclining apparatus to have the strong coupling force when it is operated as described above, a clearance should not be generated between components engaged with each other if possible.

In addition, it is preferable that the reclining apparatus, which is mounted at the portion at which the seat back and the seat cushion are connected to each other, is miniaturized and lightened.

The contents described as the related art have been provided only for assisting in the understanding for the background of the present invention and should not be considered as corresponding to the related art known to those skilled in the art.

RELATED ART DOCUMENT

Patent Document (Patent Document 1) Korean Utility Model Laid-Open Publication No. 20-0330534

SUMMARY

An object of the present invention is to provide a reclining apparatus for a vehicle seat that is capable of maintaining strong coupling force, improving strength, and removing operation noise by removing a clearance between components at the time of a reclining operation (a locked state and a locked process) and is capable of decreasing a cost by decreasing a size and a weight.

According to an exemplary embodiment of the present invention, there is provided a reclining apparatus for a vehicle seat, including: a base plate installed so as to be connected to a seat cushion and having a circular operation space formed on one surface thereof; a mobile flange installed so as to be connected to a seat back, having an outer edge installed so as to be inserted into the operation space, and having an internal gear formed in a circumferential direction on an inner peripheral surface thereof; a central cam positioned at a central portion between the base plate and the mobile flange and installed so as to be rotatable together with an input shaft; and a locking device installed so as to be connected to the central cam to be engaged with or disengaged from the internal gear depending on a rotation direction of the central cam.

The reclining apparatus for a vehicle seat may further include a spring member positioned in the operation space and having one end supported by the base plate and the other end supported by the central cam to provide elastic rotation restoring force to the central cam.

The reclining apparatus for a vehicle seat may further include a retainer installed so as to enclose both of an outer edge of the base plate and one surface of the mobile flange to retain a coupled state between the base plate and the mobile flange.

A cam groove into which the central cam may be rotatably inserted is formed at a central portion of the operation space, a pair of block supporting protrusions may be formed at outer side portions of the cam groove, a pair of gear supporting protrusions may be formed at positions bisecting a space between the block supporting protrusions, a pair of block moving grooves connected to the cam groove and directed toward the block supporting protrusions may be formed, spring insertion grooves connected to the cam groove may be formed, and two spaces positioned in any one diagonal line direction among spaces between the block supporting protrusions and the gear supporting protrusions may become first gear moving grooves, and the other two spaces positioned on another diagonal line direction may become second gear moving grooves.

Both side surfaces of the block supporting protrusions and both side surfaces of the gear supporting protrusions may be formed as inclined surfaces so that outer side portions of the block supporting protrusions and the gear supporting protrusions have widths wider, in the circumferential direction of the base plate, than those of inner side portions thereof directed toward the center of the cam groove, and inclined angles of both side surfaces may be formed so as to be bilaterally symmetrical to each other with respect to each of the block supporting protrusions and the gear supporting protrusions.

The locking device may include: a pair of cam blocks contacting the central cam and installed so as to be movable along the block moving grooves; a pair of first cam gears contacting the central cam, installed so as to be movable along the first gear moving grooves, and having first external gears formed on outer peripheral surfaces thereof and engaged with the internal gear; a pair of second cam gears contacting the central cam, installed so as to be movable along the second gear moving grooves, and having second external gears formed on outer peripheral surfaces thereof and engaged with the internal gear; and a control plate installed so as to be fitted into the central cam to be rotated together with the central cam and providing operation force so as to forcibly move the cam blocks and the first and second cam gears toward the center of the central cam in order to disengage the internal gear and the first and second external gears from each other by rotation of the central cam.

Locking jaw parts limiting movement of the first and second cam gears toward the central cam, when the internal gear and the first and second external gears are disengaged from each other, may be formed integrally with both side surfaces of the gear supporting protrusions and one side surfaces of the first and second cam gears, respectively.

An outer peripheral surface of the central cam may be provided with a pair of first cam protrusions supporting the cam blocks when the internal gear and the first and second external gears are engaged with each other, a pair of second and third cam protrusions each supporting the first and second cam gears when the internal gear and the first and second external gears are engaged with each other, and seating grooves into which the cam blocks are inserted when the internal gear and the first and second external gears are disengaged from each other, and the first and second cam gears may be each provided with gear protrusions contacting the second and third cam protrusions when the internal gear and the first and second external gears are engaged with each other.

The cam blocks and the first and second cam gears may be provided with guide protrusions protruding therefrom, respectively, and the control plate may be provided with a plurality of guide holes into which the guide protrusions are inserted, respectively, the guide holes being slit holes formed in an arc shape in the circumferential direction of the control plate.

One end and the other end of the guide hole may be formed in a shape in which a radius is gradually decreased from the center of the central cam, one end of the guide hole may be an end portion at which the guide protrusion is positioned when the internal gear and the first and second external gears are engaged with each other, and the other end of the guide hole may be an end portion at which the guide protrusion is positioned when the internal gear and the first and second external gears are disengaged from each other.

The cam block may include: a fitted part installed so as to be fitted into the block moving groove; and a body part formed integrally with the fitted part and having an inner side surface contacting the first cam protrusion and both side surfaces contacting the first and second cam gears.

Both side surfaces of the body part may be formed as inclined surfaces having a width that becomes narrow from an inner side toward the central cam toward an outer side, which is an opposite side to the inner side.

The reclining apparatus according to an exemplary embodiment of the present invention may remove a clearance between components at the time of a reclining operation (a locked state and a locked process), thereby making it possible to improve strength and entire durability and remove operation noise. Particularly, an entire size of the reclining apparatus is decreased, such that a cost and a weight of the reclining apparatus may be decreased.

DETAILED DESCRIPTION

Hereinafter, a reclining apparatus for a vehicle seat according to an exemplary embodiment of the present invention will be described with reference to the accompanying drawings.

The reclining apparatus for a vehicle seat according to an exemplary embodiment of the present invention is configured to include a base plate 10 installed so as to be connected to a seat cushion and having a circular operation space 11 formed on one surface thereof, a mobile flange 20 installed so as to be connected to a seat back, having an outer edge installed so as to be inserted into the operation space 11, and having an internal gear 21 formed in a circumferential direction on an inner peripheral surface thereof, a central cam 40 positioned at a central portion between the base plate 10 and the mobile flange 20 and installed so as to be rotatable together with an input shaft 30, a locking device installed so as to be connected to the central cam 40 to be engaged with or disengaged from the internal gear 21 depending on a rotation direction of the central cam 40, a spring member 50 positioned in the operation space 11 and having one end supported by the base plate 10 and the other end supported by the central cam 40 to provide elastic rotation restoring force to the central cam 40, and a retainer 100 installed so as to enclose both of an outer edge of the base plate 10 and one surface of the mobile flange 20 to retain a coupled state between the base plate 10 and the mobile flange 20, as shown in FIGS. 1 to 11.

Here, the spring member 50, which is a spiral spring, is installed in a structure in which an outer distal end thereof is supported by the base plate 10 and an inner distal end thereof is supported by the central cam 40.

Figure 1:
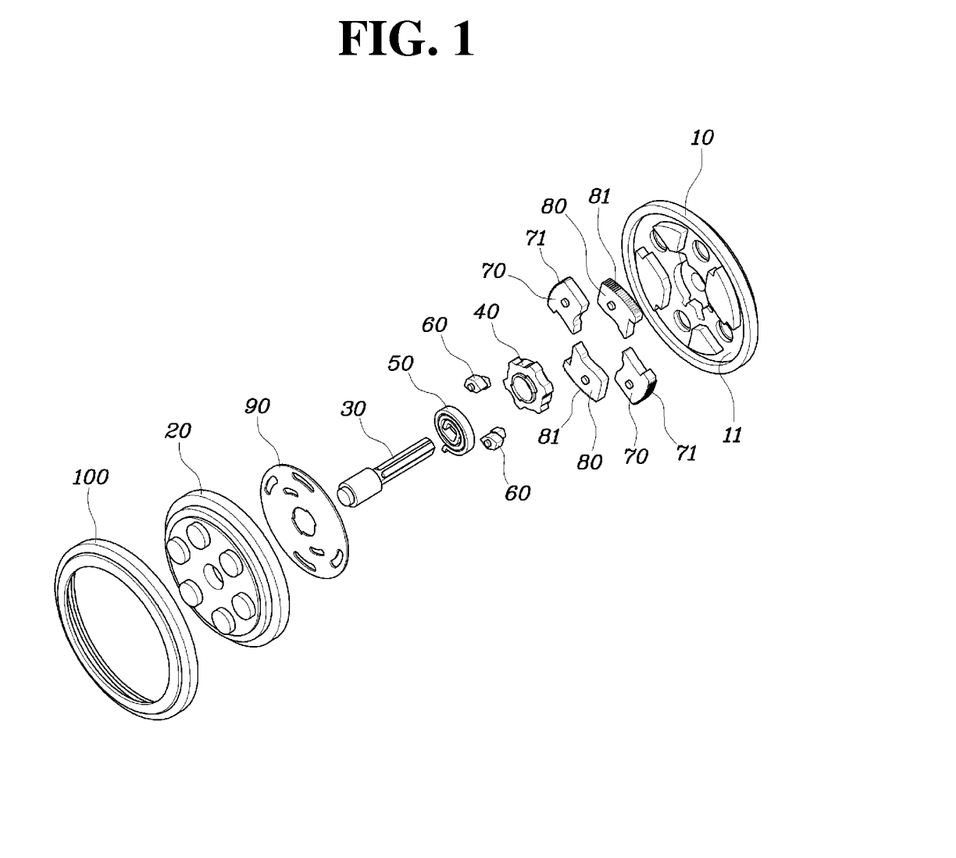
FIG. 1 is an exploded perspective view of a reclining apparatus according to an exemplary embodiment of the present invention.
Figure 2:
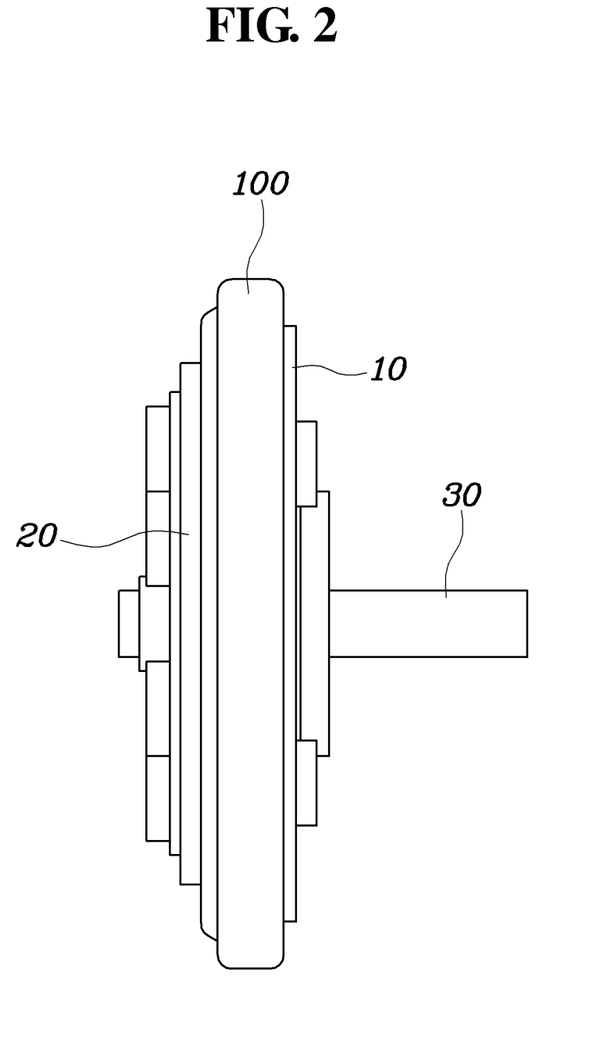
FIG. 2 is a side view of a coupled state of FIG. 1.
Figure 3:
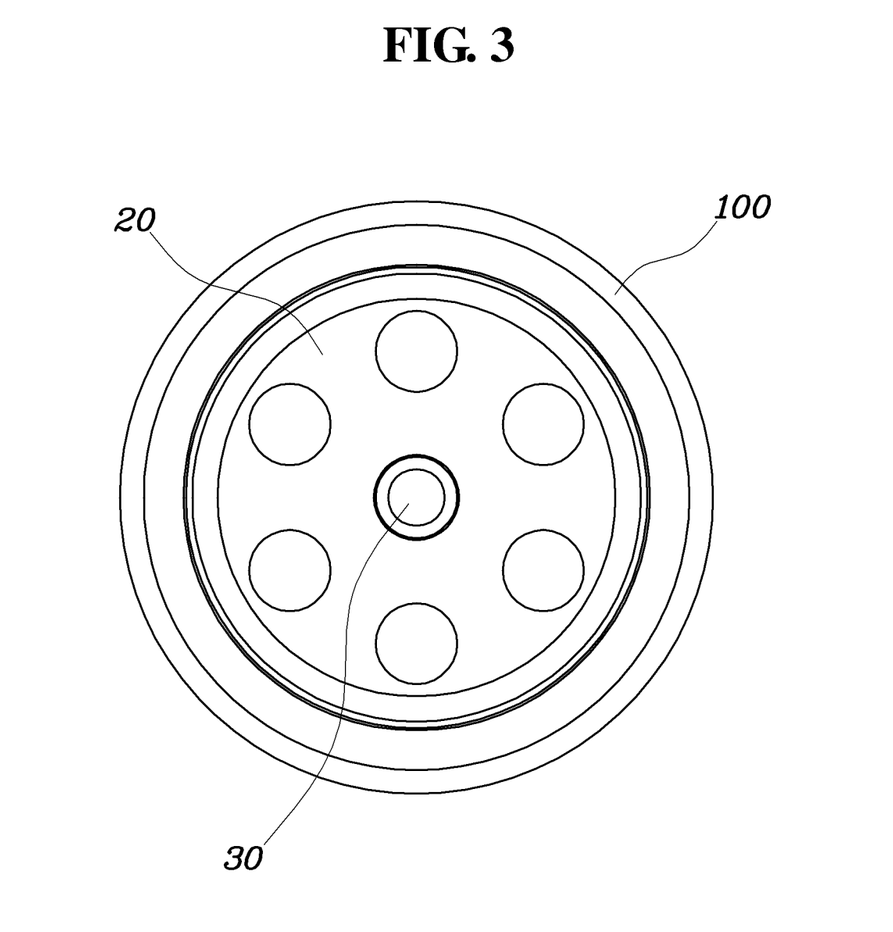
FIGS. 3 and 4 are, respectively, a left side view and a right side view of FIG. 2.
Figure 4:
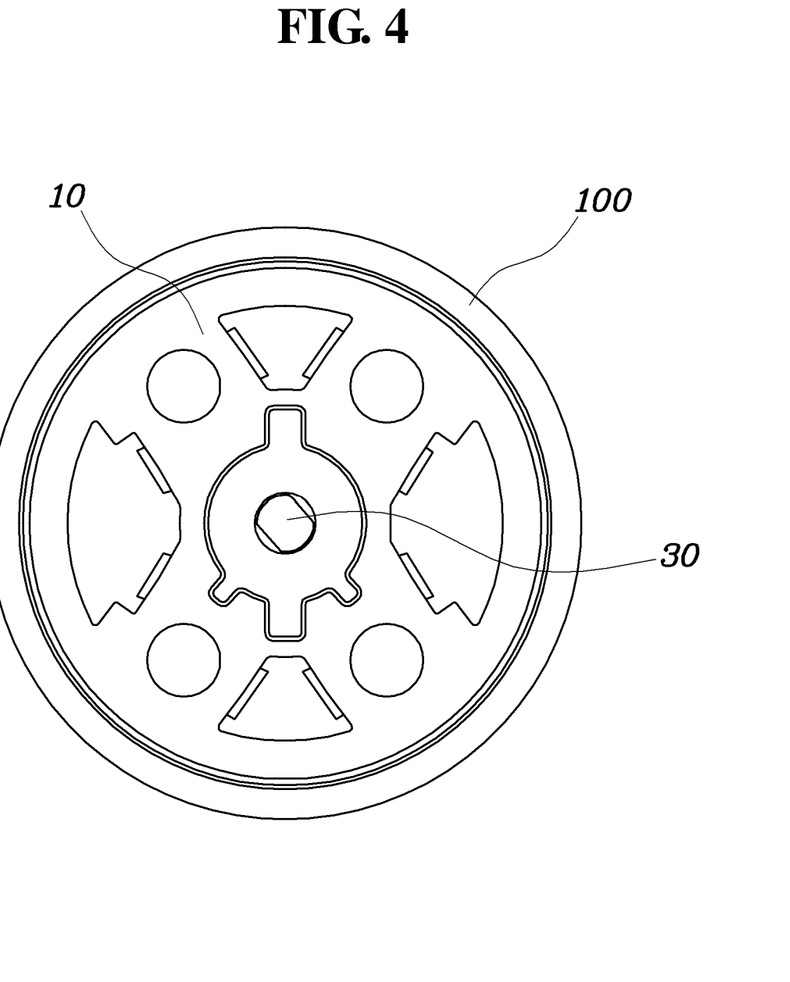
Figure 5:
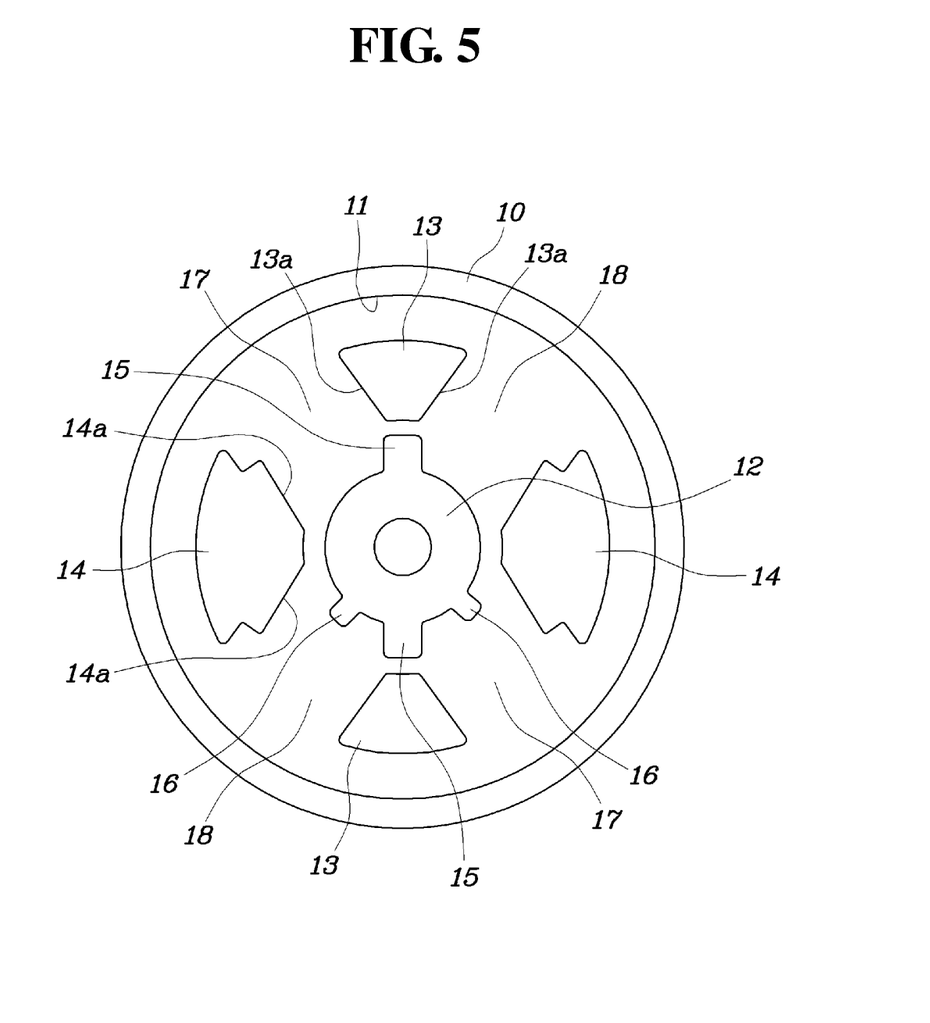
FIG. 5 is a front view of a base plate configuring the reclining apparatus according to an exemplary embodiment of the present invention.

A cam groove 12 into which the central cam 40 is rotatably inserted is formed at a central portion of the operation space 11 provided in the base plate 10, a pair of block supporting protrusions 13 are formed symmetrically to each other at positions forming a phase of 180 degrees based on the cam groove 12, a pair of gear supporting protrusions 14 are formed symmetrically to each other at positions bisecting a space between the block supporting protrusions 13, a pair of block moving grooves 15 connected to the cam groove 12 and directed toward the block supporting protrusions 13 are formed symmetrically to each other, spring insertion grooves 16 connected to the cam groove 12 are formed, two spaces formed symmetrically to each other while forming a phase of 180 degrees among spaces between the block supporting protrusions 13 and the gear supporting protrusions 14 become first gear moving grooves 17, and the other two spaces formed symmetrically to each other become second gear moving grooves 18.

Both side surfaces 13a of the block supporting protrusions 13 and both side surfaces 14a of the gear supporting protrusions 14 are formed as inclined surfaces so that outer side portions of the block supporting protrusions 13 and the gear supporting protrusions 14 have widths wider, in the circumferential direction of the base plate 10, than those of inner side portions thereof directed toward the center of the cam groove 12, and inclined angles of both side surfaces 13a and 14a are formed so as to be bilaterally symmetrical to each other with respect to each of the block supporting protrusions 13 and the gear supporting protrusions 14.

Meanwhile, the locking device is configured to include a pair of cam blocks 60 contacting the central cam 40 and installed so as to be movable along the block moving grooves 15, a pair of first cam gears 70 contacting the central cam 40, installed so as to be movable along the first gear moving grooves 17, and having first external gears 71 formed on outer peripheral surfaces thereof and engaged with the internal gear 21, a pair of second cam gears 80 contacting the central cam 40, installed so as to be movable along the second gear moving grooves 18, and having second external gears 81 formed on outer peripheral surfaces thereof and engaged with the internal gear 21, and a control plate 90 installed so as to be fitted into the central cam 40 to be rotated together with the central cam 40 and providing operation force so as to forcibly move the cam blocks 60 and the first and second cam gears 70 and 80 toward the center of the central cam 40 in order to disengage the internal gear 21 and the first and second external gears 71 and 81 from each other by rotation of the central cam 40.

Locking jaw parts 111 and 113 limiting movement of the first and second cam gears 70 and 80 toward the central cam 40 when the internal gear 21 and the first and second external gears 71 and 81 are disengaged from each other are formed integrally with both side surfaces 14a of the gear supporting protrusions 14 and one side surfaces of the first and second cam gears 70 and 80, respectively.

An outer peripheral surface of the central cam 40 is provided with a pair of first cam protrusions 41 supporting the cam blocks 60 when the internal gear 21 and the first and second external gears 71 and 81 are engaged with each other, a pair of second and third cam protrusions 42 and 43 each supporting the first and second cam gears 70 and 80 when the internal gear 21 and the first and second external gears 71 and 81 are engaged with each other, and seating grooves 44 into which the cam blocks 60 are inserted when the internal gear 21 and the first and second external gears 71 and 81 are disengaged from each other; and the first and second cam gears 70 and 80 are each provided with gear protrusions 72 and 82 contacting the second and third cam protrusions 42 and 43 when the internal gear 21 and the first and second external gears 71 and 81 are engaged with each other.

The cam blocks 60 and the first and second cam gears 70 and 80 are provided with guide protrusions 115 protruding integrally therewith, respectively, and the control plate 90 is provided with a plurality of guide holes 91 into which the guide protrusions 115 are inserted, respectively, wherein the guide holes 91 are slit holes formed in an arc shape in the circumferential direction of the control plate 90.

Figure 6:
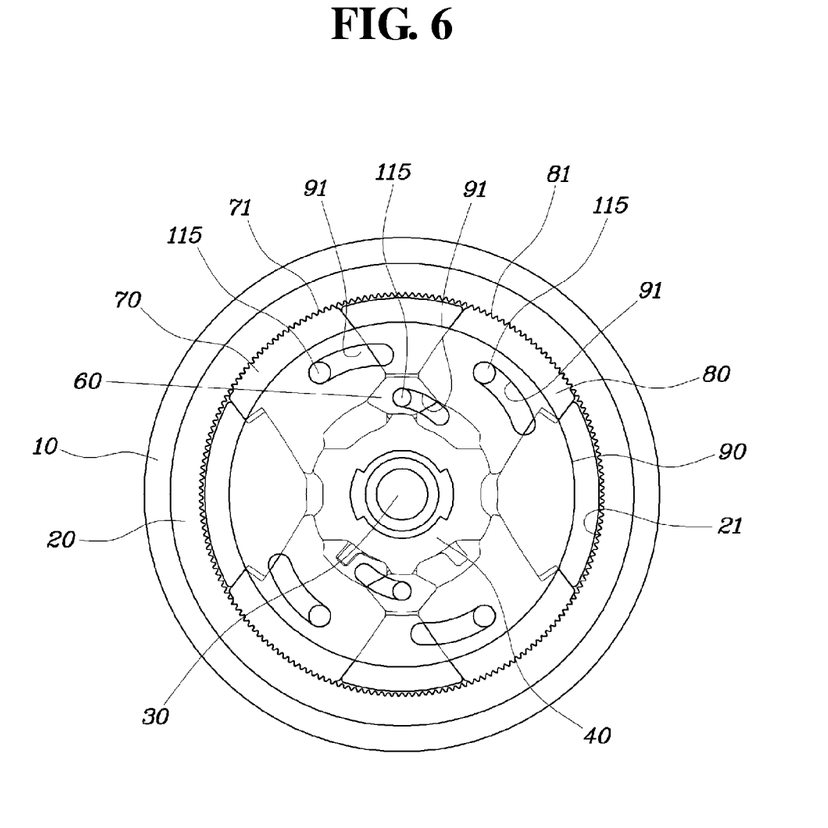
FIG. 6 is a view showing a locked state of the reclining apparatus according to an exemplary embodiment of the present invention.
Figure 9:
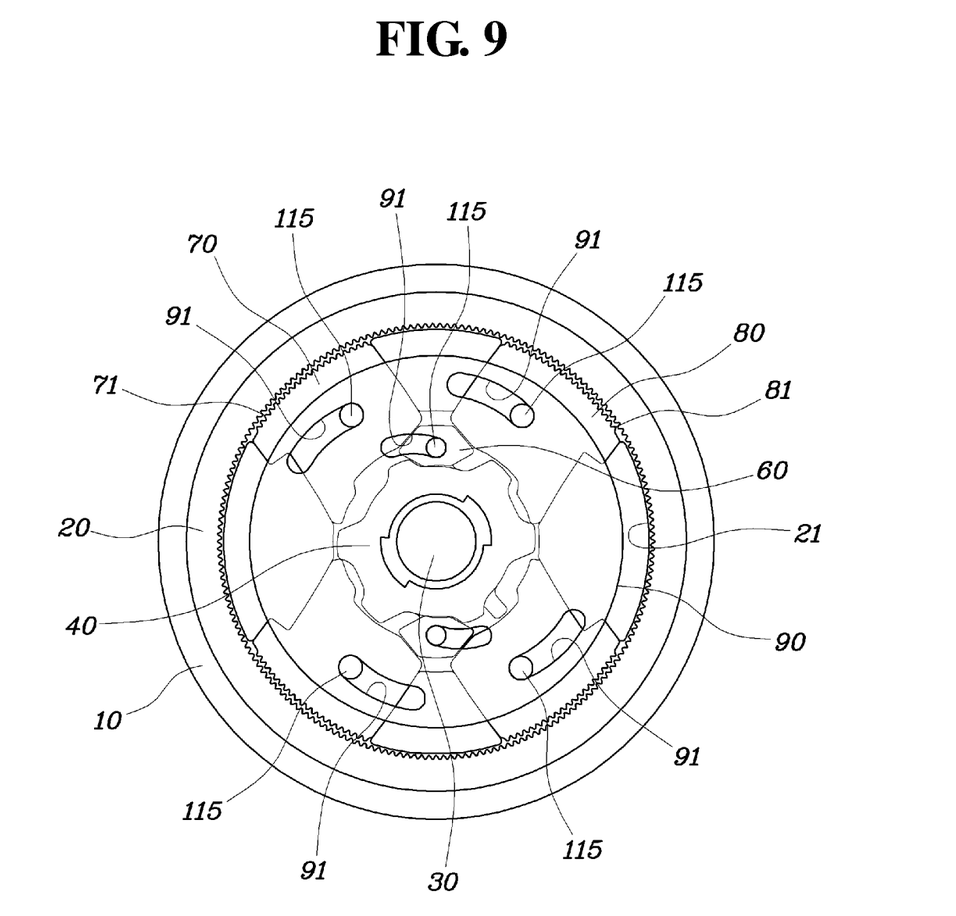
FIG. 9 is a view showing an unlocked state of the reclining apparatus according to an exemplary embodiment of the present invention.

Here, one end and the other end of the guide hole 91 are formed in a shape in which a radius is gradually decreased from the center of the central cam 40, one end of the guide hole 91 is an end portion at which the guide protrusion 115 is positioned when the internal gear 21 and the first and second external gears 71 and 81 are engaged with each other as shown in FIG. 6, and the other end of the guide hole 91 is an end portion at which the guide protrusion 91 is positioned when the internal gear 21 and the first and second external gears 71 and 81 are disengaged from each other as shown in FIG. 9.

Figure 11:
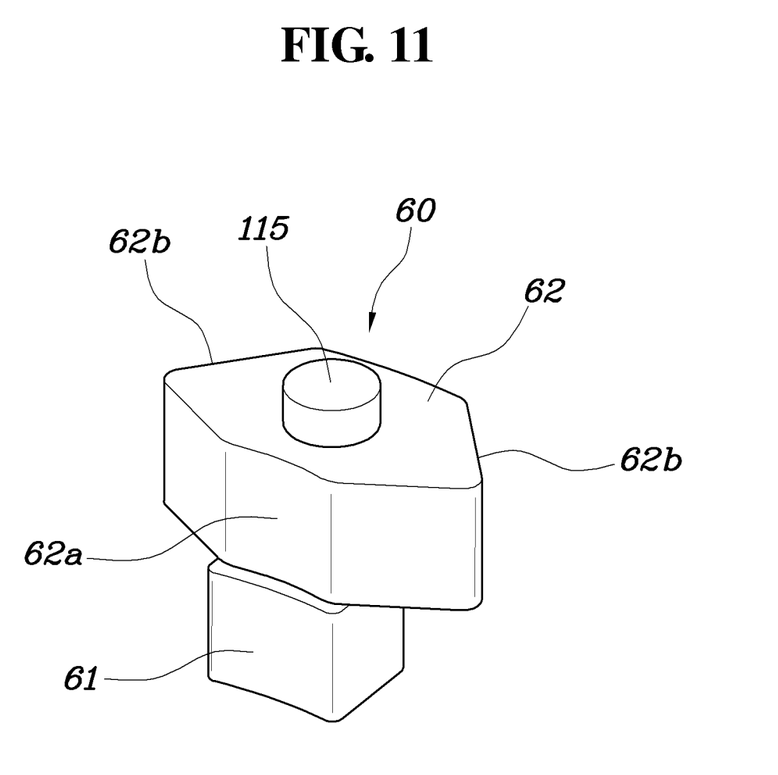
FIG. 11 is a perspective view of a cam block configuring the reclining apparatus according to an exemplary embodiment of the present invention.

In addition, the cam block 60 is configured to include a fitted part 61 installed so as to be fitted into the block moving groove 15 and a body part 62 formed integrally with the fitted part 61 and having an inner side surface 62a contacting the first cam protrusion 41 and both side surfaces 62b contacting the first and second cam gears 70 and 80.

The body part 62 has the guide protrusion 115 protruding on an upper surface thereof.

Both side surfaces 62b of the body part 62 are formed as inclined surfaces having a width that becomes narrow from an inner side toward the central cam 40 toward an outer side, which is an opposite side to the inner side.

Hereinafter, an operation of the reclining apparatus according to an exemplary embodiment of the present invention will be described.

Figure 7:
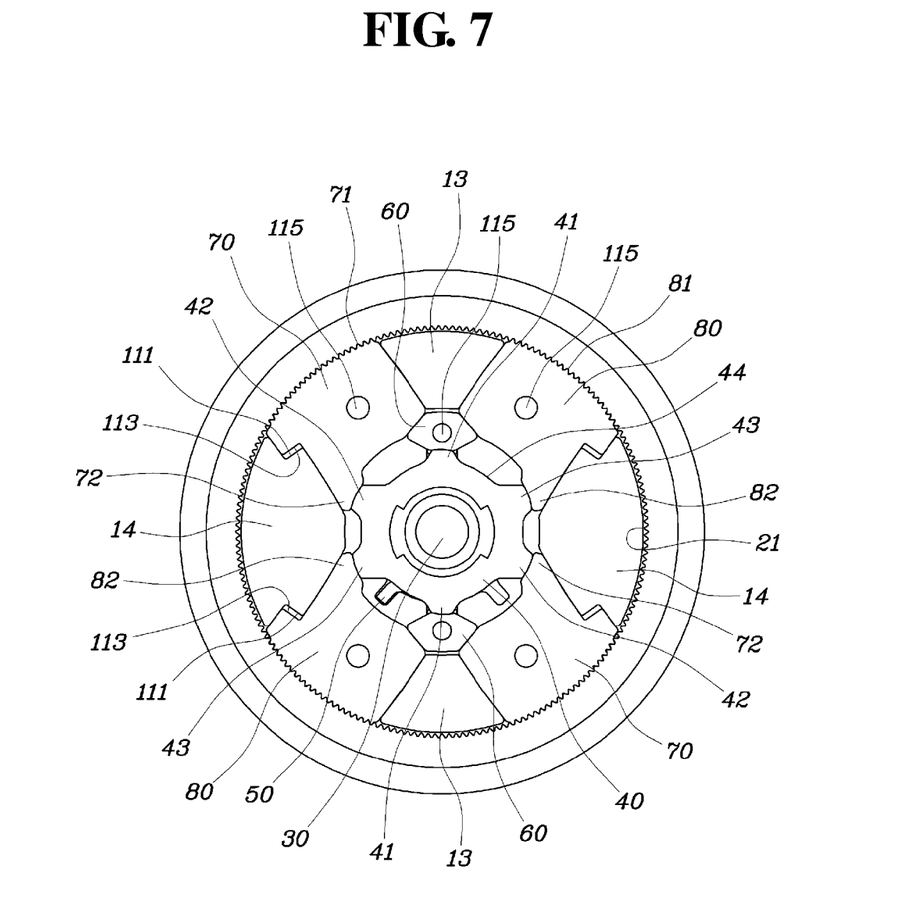
FIG. 7 is a view showing a state in which a control plate is removed in FIG. 6.
Figure 8:
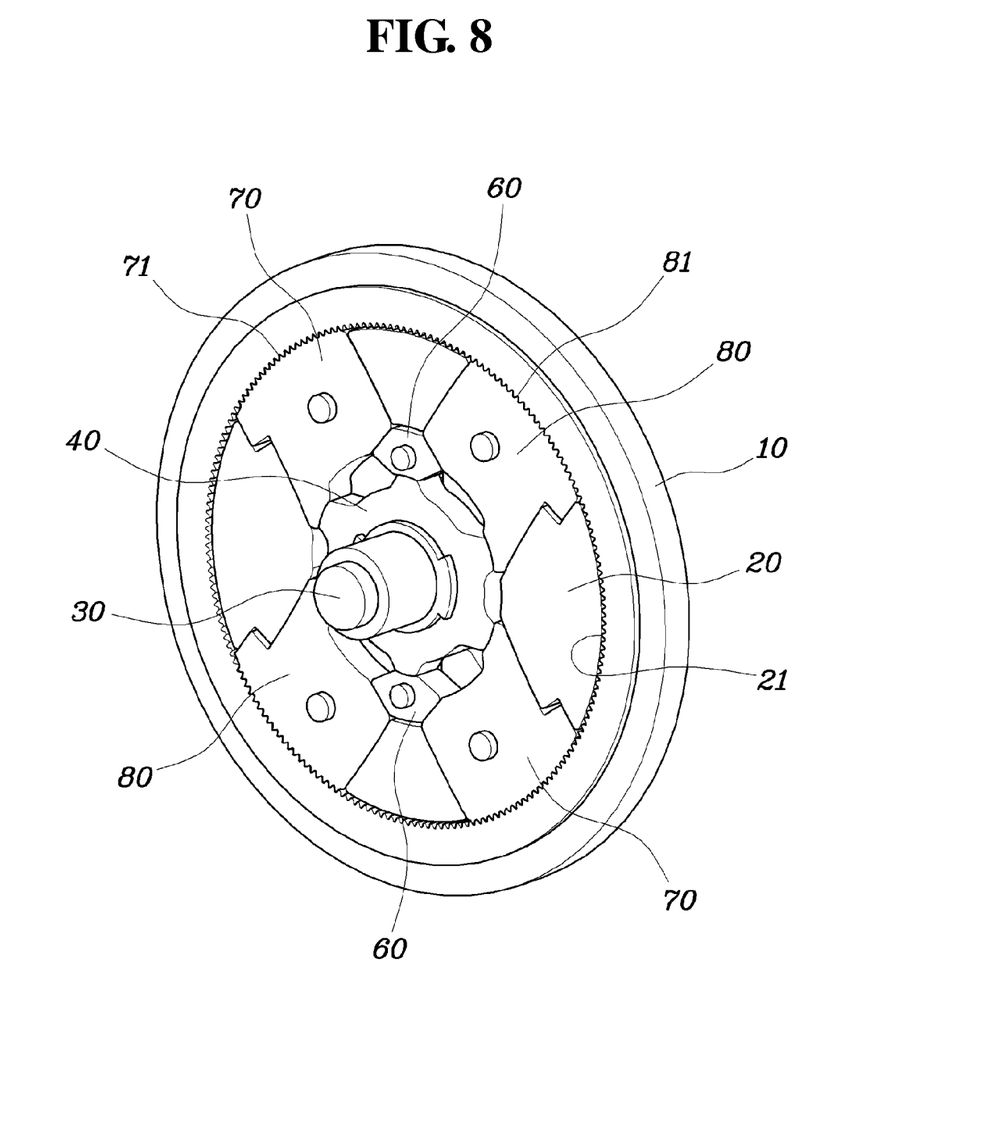
FIG. 8 is a perspective view of FIG. 6.

FIGS. 6 to 8 show a state in which the internal gear 21 and the first and second external gears 71 and 81 are engaged with each other. In this case, the reclining apparatus is in a locked state.

When the reclining apparatus is maintained in the locked state, the mobile flange 20 does not rotate with respect to the base plate 10, such that adjustment of an angle of the seat back in front and rear directions is not made.

In addition, when the reclining apparatus is maintained in the locked state, both side surfaces of the first and second cam gears 70 and 80 are completely closely adhered to the side surfaces of the block supporting protrusions 13 and the side surfaces of the gear supporting protrusions 14, as shown in FIG. 7, thereby making it possible to prevent a clearance from being generated between components. Therefore, coupling force and strength of the reclining apparatus may be improved.

Further, when the reclining apparatus is maintained in the locked state, the central cam 40 and the cam blocks 60 support the first and second cam gears 70 and 80, such that the first and second external gears 71 and 81 included in the first and second cam gears 70 and 80 may be maintained in a state in which they are completely engaged with the internal gear 21 included in the mobile flange 20. Therefore, the coupling force and the strength of the reclining apparatus may be improved.

In addition, the reclining apparatus according to an exemplary embodiment of the present invention has a configuration in which it is maintained in the locked state by engaging the first and second cam gears 70 and 80, of which the total number is four, with the mobile flange 20. The coupling force and the strength of the reclining apparatus may be further improved due to the first and second cam gears 70 and 80 of which the total number is four, and an entire size of the reclining apparatus may be decreased, such that a cost and a weight of the reclining apparatus may be decreased.

Figure 10:
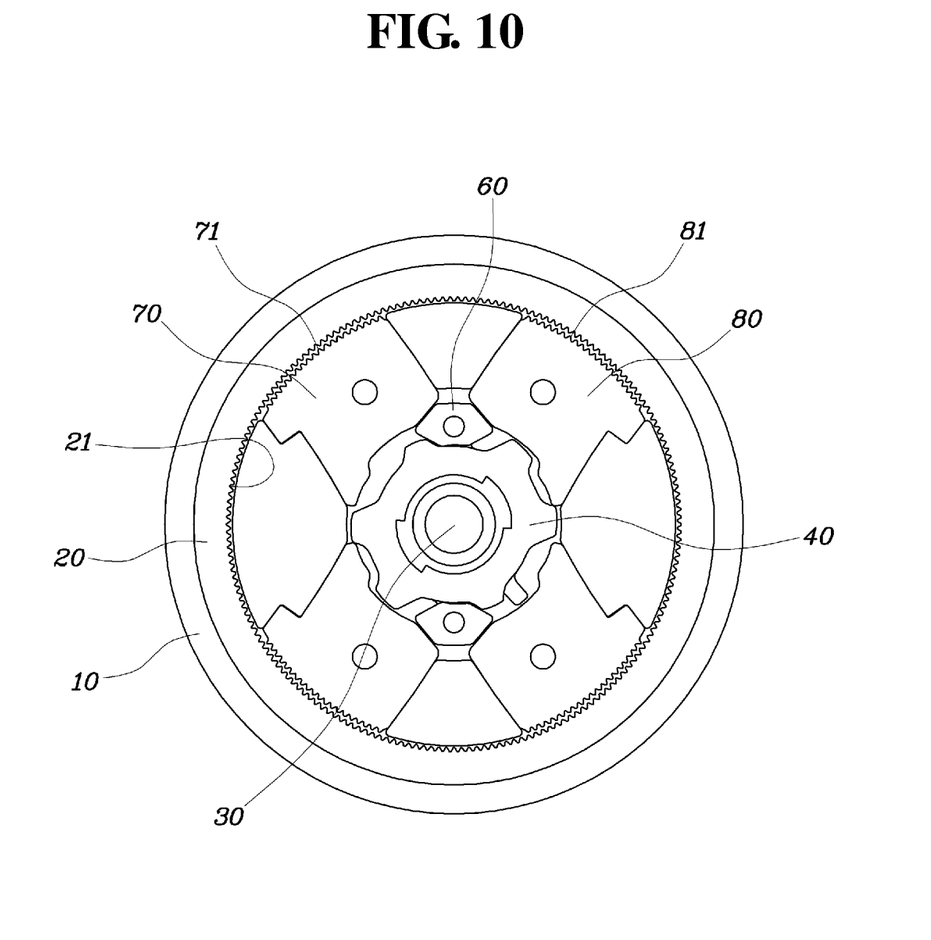
FIG. 10 is a view showing a state in which a control plate is removed in FIG. 9.

FIGS. 9 and 10 show a state in which the internal gear 21 and the first and second external gears 71 and 81 are disengaged from each other. In this case, the reclining apparatus is in an unlocked state.

When the reclining apparatus is maintained in the unlocked state, the mobile flange 20 may smoothly rotate with respect to the base plate 10, such that adjustment of an angle of the seat back in the front and rear directions may be made.

When the input shaft 30, the central cam 40, and the control plate 90 rotate counterclockwise in the locked state as shown in FIG. 6, supporting force of the first and second cam gears 70 and 80 by the central cam 40 is released. At the same time, supporting force of the first and second cam gears 70 and 80 by the cam blocks 60 is released. At the same time, the guide holes 91 formed in the control plate 90 pull the guide protrusions 115 toward the central cam 40.

In this case, as shown in FIG. 9, the first and second external gears 71 and 81 formed in the first and second cam gears 70 and 80 are separated and spaced apart from the internal gear 21 formed in the mobile flange 20, such that the mobile flange 20 is converted into a state in which it may smoothly rotate with respect to the base plate 10. In this state, an angle of the seat back coupled to the mobile flange 20 may be adjusted in the front and rear directions.

In addition, when force applied to the input shaft 30 is removed after the adjustment of the angle of the seat back is completed, the central cam 40 is converted from the state of FIG. 9 into the state of FIG. 6 by elastic restoring force of the spring member 50. Finally, the first and second external gears 71 and 81 formed in the first and second cam gears 70 and 80 are again engaged with the internal gear 21 formed in the mobile flange 20, such that the reclining apparatus is again converted into the locked state.

As described above, the reclining apparatus according to an exemplary embodiment of the present invention may remove the clearance between the components at the time of the reclining operation (the locked state and the locked process), thereby making it possible to improve strength and entire durability and remove operation noise. Particularly, the entire size of the reclining apparatus is decreased, such that a cost and a weight of the reclining apparatus may be decreased.

Although the present invention has been shown and described with respect to specific exemplary embodiments, it will be obvious to those skilled in the art that the present invention may be variously modified and altered without departing from the spirit and scope of the present invention as defined by the following claims.

| [Detailed Description of Main Elements] | |
| --- | --- |
| 10: base plate | 20: mobile flange |
| 30: input shaft | 40: central cam |
| 50: spring member | 60: cam block |
| 70: first cam gear | 80: second cam gear |
| 90: control plate | 100: retainer |

The invention claimed is:

1. A reclining apparatus for a vehicle seat, comprising:
a base plate 10 installed so as to be connected to a seat cushion and having a circular operation space 11 formed on one surface thereof;
a mobile flange 20 installed so as to be connected to a seat back, having an outer edge installed so as to be inserted into the operation space 11, and having an internal gear 21 formed in a circumferential direction on an inner peripheral surface thereof;
a central cam 40 positioned at a central portion between the base plate 10 and the mobile flange 20 and installed so as to be rotatable together with an input shaft 30; and
a locking device installed so as to be connected to the central cam 40 to be engaged with or disengaged from the internal gear 21 depending on a rotation direction of the central cam 40, wherein the locking device comprises:
the central cam 40 rotatably supported on the input shaft 30 about a central axis;
at least on cam block 60 slidably supported for movement in a radial direction toward and away from the central axis on at least one of the base plate 10 and the mobile flange 20; and
at least one first cam gear 70 having a first external gear 71 for engagement with the internal gear 21 and at least one second cam gear 80 having a second external gear 81 for engagement with the internal gear 21, wherein each of the cam gears 70, 80 is radially slidably supported for movement in a radial direction toward and away from the central axis on at least one of the base plate 10 and the mobile flange 20, wherein each of the first and second cam gears 70, 80 has two opposite side edges that are generally parallel to the radial direction of sliding of the respective cam gear 70, 80;
wherein in an engaged position, the at least one cam block 60 simultaneously engages both cam gears at a respective one of the side edges, and the central cam simultaneously engages the cam block 60 and both of the cam gears 70, 80 at respective other of the side edges of the cam gears.

2. The reclining apparatus for a vehicle seat of claim 1, further comprising a spring member 50 positioned in the operation space 11 and having one end supported by the base plate 10 and the other end supported by the central cam 40 to provide elastic rotation restoring force to the central cam 40.

3. The reclining apparatus for a vehicle seat of claim 1 or 2, further comprising a retainer 100 installed so as to enclose both of an outer edge of the base plate 10 and one surface of the mobile flange 20 to retain a coupled state between the base plate 10 and the mobile flange 20.

4. The reclining apparatus for a vehicle seat of claim 1, wherein a cam groove 12 into which the central cam 40 is rotatably inserted is at a central portion of the operation space 11,
a pair of block supporting protrusions 13 are at outer side portions of the cam groove 12,
a pair of gear supporting protrusions 14 are at positions bisecting a space between the block supporting protrusions 13,
a pair of block moving grooves 15 are each connected to the cam groove 12 and directed toward the block supporting protrusions 13,
spring insertion grooves 16 are connected to the cam groove 12, and
two spaces positioned in one diagonal line direction among spaces between the block supporting protrusions 13 and the gear supporting protrusions 14 are first gear moving grooves 17, and another two spaces positioned on another diagonal line direction are second gear moving grooves 18.

5. The reclining apparatus for a vehicle seat of claim 4, wherein both side surfaces 13a of the block supporting protrusions 13 and both side surfaces 14a of the gear supporting protrusions 14 are formed as inclined surfaces so that radially outer side portions of the block supporting protrusions 13 and the gear supporting protrusions 14 have widths wider, in the circumferential direction of the base plate 10, than those of radially inner side portions thereof directed toward the center of the cam groove 12, and inclined angles of both side surfaces 13a and 14a are formed so as to be bilaterally symmetrical to each other with respect to each of the block supporting protrusions 13 and the gear supporting protrusions 14.

6. The reclining apparatus for a vehicle seat of claim 5, wherein the locking device includes:
- a pair of cam blocks 60 contacting the central cam 40 and installed so as to be movable along the block moving grooves 15;
- a pair of first cam gears 70, including the first cam gear 70, contacting the central cam 40, the pair of first cam gears 80 installed so as to be movable along the first gear moving grooves 17, and having respective first external gears 71, including the first external gear 71, formed on outer peripheral surfaces thereof and engaged with the internal gear 21;
- a pair of second cam gears 80, including the second cam gear 80, contacting the central cam 40, the pair of second cam gears 80 installed so as to be movable along the second gear moving grooves 18, and having respective second external gears 81, including the second external gear 81, formed on outer peripheral surfaces thereof and engaged with the internal gear 21; and
- a control plate 90 installed so as to be fitted into the central cam 40 to be rotated together with the central cam 40 and providing operation force so as to forcibly move the cam blocks 60 and the first and second cam gears 70 and 80 toward the center of the central cam 40 in order to disengage the internal gear 21 and the first and second external gears 71 and 81 from each other by rotation of the central cam 40.

7. The reclining apparatus for a vehicle seat of claim 6, wherein locking jaw parts 111 and 113 limiting movement of the first and second cam gears 70 and 80 toward the central cam 40, when the internal gear 21 and the first and second external gears 71 and 81 are disengaged from each other, wherein the locking jaw parts 111, and 113 are formed integrally with both side surfaces 14a of the gear supporting protrusions 14 and one of the side surfaces of each of the first and second cam gears 70 and 80, respectively.

8. The reclining apparatus for a vehicle seat of claim 6, wherein an outer peripheral surface of the central cam 40 is provided with a pair of first cam protrusions 41 supporting the cam blocks 60 when the internal gear 21 and the first and second external gears 71 and 81 are engaged with each other, a pair of second and third cam protrusions 42 and 43 each supporting the first and second cam gears 70 and 80 when the internal gear 21 and the first and second external gears 71 and 81 are engaged with each other, and seating grooves 44 into which the cam blocks 60 are inserted when the internal gear 21 and the first and second external gears 71 and 81 are disengaged from each other, and
- the first and second cam gears 70 and 80 are each provided with gear protrusions 72 and 82 contacting the second and third cam protrusions 42 and 43 when the internal gear 21 and the first and second external gears 71 and 81 are engaged with each other.

9. The reclining apparatus for a vehicle seat of claim 6, wherein the cam blocks 60 and the first and second cam gears 70 and 80 are provided with guide protrusions 115 protruding therefrom, respectively, and
- the control plate 90 is provided with a plurality of guide holes 91 into which the guide protrusions 115 are inserted, respectively, the guide holes 91 being slit holes formed in an arc shape in the circumferential direction of the control plate 90.

10. The reclining apparatus for a vehicle seat of claim 9, wherein one end and the other end of the guide hole 91 are formed in a shape in which a radius is gradually decreased from the center of the central cam 40,
- one end of the guide hole 91 is an end portion at which the guide protrusion 115 is positioned when the internal gear 21 and the first and second external gears 71 and 81 are engaged with each other, and
- the other end of the guide hole 91 is an end portion at which the guide protrusion 115 is positioned when the internal gear 21 and the first and second external gears 71 and 81 are disengaged from each other.

11. The reclining apparatus for a vehicle seat of claim 8, wherein the cam block 60 includes:
- a fitted part 61 installed so as to be fitted into the block moving groove 15; and
- a body part 62 formed integrally with the fitted part 61 and having an inner side surface 62a contacting the first cam protrusion 41 and both side surfaces 62b contacting the first and second cam gears 70 and 80.

12. The reclining apparatus for a vehicle seat of claim 11, wherein both side surfaces 62b of the body part 62 are formed as inclined surfaces having a width that becomes narrow from an inner side toward the central cam 40 toward an outer side, which is an opposite side to the inner side.

* * * * *